United States Patent

[11] 3,582,714

[72] Inventors Benjamin Shmurak Lynbrook; Richard Projain, Syosset; Thomas Kelleher, Farmingdale; Maurice Paulson, Huntington, all of, N.Y.

[21] Appl. No. 844,552

[22] Filed July 24, 1969

[45] Patented June 1, 1971

[73] Assignee Lambda Electronics Corporation Huntington, N.Y.

[54] MULTIPLE-OUTPUT CHASSIS-LESS POWER SUPPLY HAVING A HEAT DISSIPATING HOUSING OF UNITARY CONSTRUCTION

6 Claims, 12 Drawing Figs.

[52] U.S. Cl. .......... 317/100, 317/120

[51] Int. Cl. .......... H02b 1/08, H02b 1/18

[50] Field of Search .......... 317/99-—101, 118, 120; 174/15, 16, HS

[56] References Cited

UNITED STATES PATENTS

| | | | |
|---|---|---|---|
| 2,740,905 | 4/1956 | Henderson | 317/99X |
| 3,147,402 | 9/1964 | Hochstetler | 317/99X |
| 3,157,828 | 11/1964 | Flaherty | 317/100 |
| 3,177,407 | 4/1965 | Paterson | 317/101 |
| 3,316,454 | 4/1967 | Donath | 317/100 |

*Primary Examiner*—Lewis H. Myers

*Assistant Examiner*—Gerald P. Tolin

*Attorney*—Morgan, Finnegan, Durham and Pine

ABSTRACT: A multiple-output power supply which utilizes its die-cast housing as its heat dissipating means and eliminates the need for a separate chassis by having the power supply components affixed directly to the die-cast housing. Printed circuit boards are positioned about a transformer which is in thermal conductive relationship with the die-cast housing due to the utilization of transformer mounting brackets which pass through the center of the transformer. Power transistors are externally accessible, being recessed in heat conductive relationship with the die-cast housing. Miniaturized barrier strips appear externally across one face of the die-cast housing. The barrier strips have insulating spacers between conductive terminals which not only insulate the conductive thermals from each other but also from externally mounted conductive accessories. Cover plates are detachably affixed to said die-cast housing over the printed circuit boards creating a chassis-less power supply, rectangular in shape, compact in size, multipositional in mounting and easily serviced.

INVENTORS
BENJAMIN SHMURAK
RICHARD PROJAIN
THOMAS KELLEHER
MAURICE PAULSON
BY
Morgan, Finnegan, Durham & Pine
ATTORNEYS INVENTORS
BENJAMIN SHMURAK
RICHARD PROJAIN
THOMAS KELLEHER
MAURICE PAULSON
BY
Morgan, Finnegan, Durham & Pine
ATTORNEYS INVENTORS
BENJAMIN SHMURAK
RICHARD PROJAIN
THOMAS KELLEHER
MAURICE PAULSON
BY
Morgan, Finnegan, Durham & Pine
ATTORNEYS INVENTORS
BENJAMIN SHMURAK
RICHARD PROJAIN
THOMAS KELLEHER
MAURICE PAULSON
BY
Morgan, Finnegan, Durham & Pine
ATTORNEYS INVENTORS
BENJAMIN SHMURAK
RICHARD PROJAIN
THOMAS KELLEHER
MAURICE PAULSON
BY
Morgan, Finnegan, Durham & Pine
ATTORNEYS

MULTIPLE-OUTPUT CHASSIS-LESS POWER SUPPLY HAVING A HEAT DISSIPATING HOUSING OF UNITARY CONSTRUCTION

BACKGROUND AND SUMMARY OF THE INVENTION

The invention is for a new design in power supplied which overcomes many of the disadvantages of prior art power supplies.

Prior art power supplies require a separate heat exchanger incorporated within the embodiment of the power supply. As a result, an additional component was needed to be incorporated into the design layout of prior art power supplies, thus adding to their overall size and cost. In addition, due to both the inherent directional sensitivity of such prior art heat exchangers and their bulky design, the versatility in mounting prior art power supplies was severely limited. Prior art power supplies also employed a chassis which hampered rather than eased servicing.

The objects of this invention are to eliminate many of the disadvantages which exist in the prior art.

In particular, it is an object of this invention to create either a single or multiple output, chassis-less power supply.

It is another object of this invention to create a power supply that has a die-cast housing which acts as a heat sink.

It is another object of this invention to create a power supply which is compact, easily manufactured, easily serviced and capable of multipositional mounting.

It is another object of the invention to create a power supply incorporating new transformer brackets which ease the task of mounting the transformer within the housing in addition to enabling the placement of the transformer into compact dimensions.

It is another object of this invention to create a power supply in which printed circuits are utilized and in which the circuit boards are readily accessible for servicing.

It is another object of this invention to create a power supply having externally mounted transistors in thermal conductive relationship with a die-cast housing and recessed within the housing so as not to alter the multipositional mounting capability of the power supply.

It is another object of this invention to create a power supply which, during fabrication, has its printed circuit boards subjected to the wave soldering during one continuous soldering process.

The above objectives are accomplished as a result of the design of the instant invention. By utilizing a die-cast housing as the heat dissipating means for the power supply, a compact, easily manufactured, multipositional power supply is created. In addition, by affixing to said housing the various components of the power supply, the need for a chassis is eliminated as are the confining restrictions inherent in such a design. Printed circuit boards are affixed to said die-cast housing. The circuit boards are easily accessible for servicing and are in one embodiment on opposite sides of a centrally mounted transformer.

Nonferrous transformer brackets are designed to pass through the coil of said transformer thus enabling the transformer to be mounted within limited dimensions. In addition, the brackets provide a thermal conductive path between the transformer and the die-cast housing. By externally mounting the transistors of the power supply within a recess of the die-cast housing, heat dissipation through the housing is accomplished in addition to facilitating any servicing of the transistors. By recessing the transistors, the power supply retains its capability for multipositional mounting.

DESCRIPTION OF THE DRAWINGS

Having summarized the invention, a more detailed description follows with reference being made to the accompanying drawings which form a part of the specification of which.

DETAILED DESCRIPTION OF THE INVENTION

Figures 1, 2:
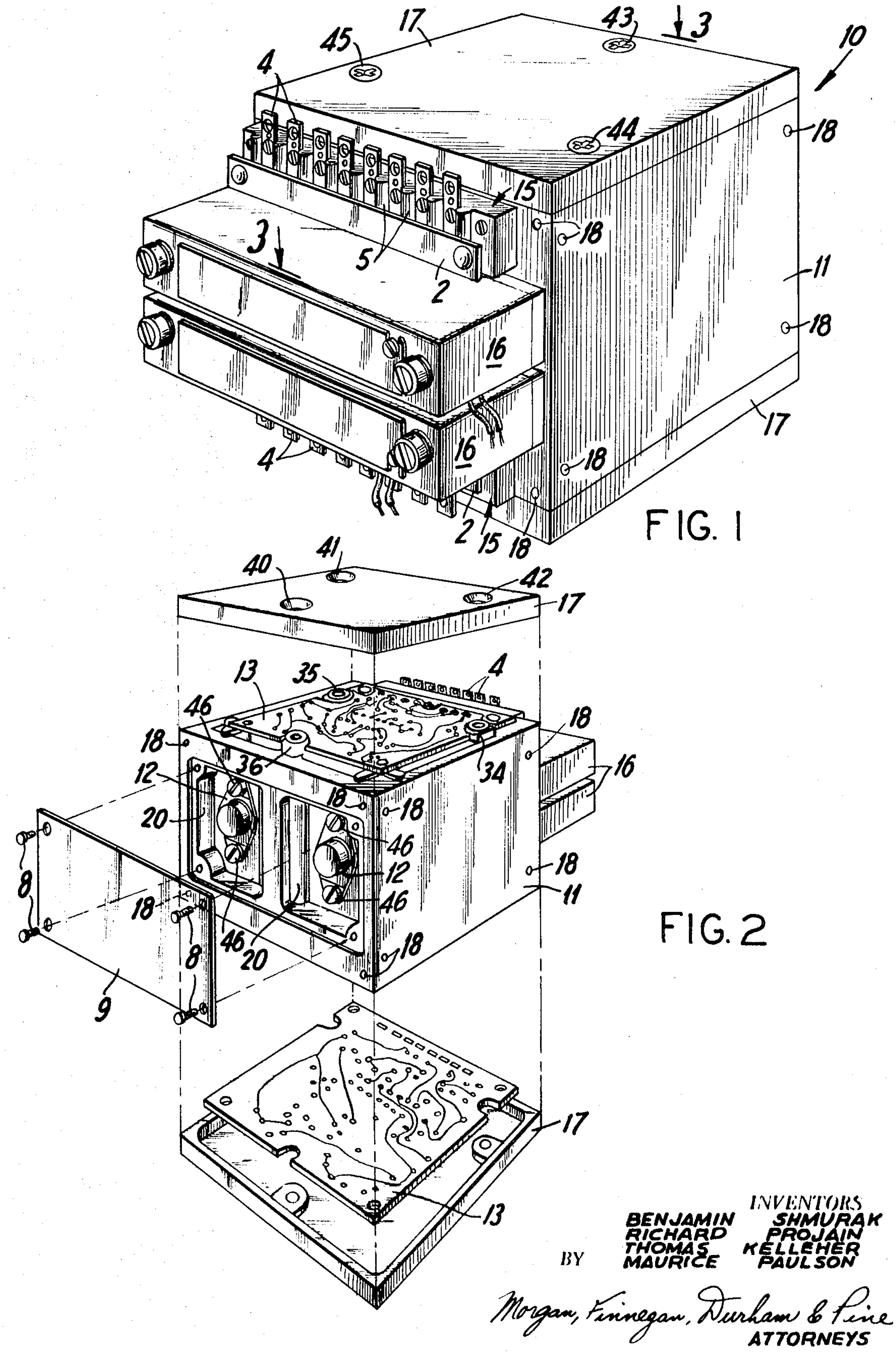
FIG. 1 is a perspective view of the power supply of the present invention.
FIG. 2 is an exploded perspective view of the power supply of FIG. 1.
Figure 3:
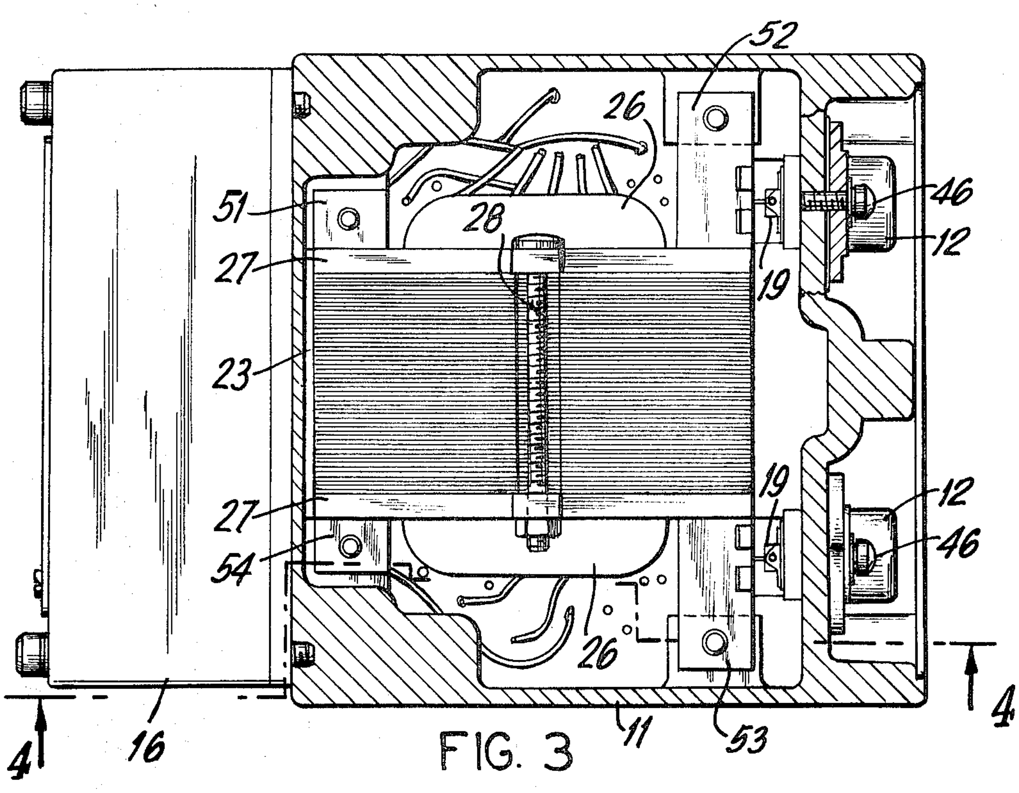
FIG. 3 is a horizontal sectional view of the power supply taken along line 3–3 of FIG. 1.
Figure 4:
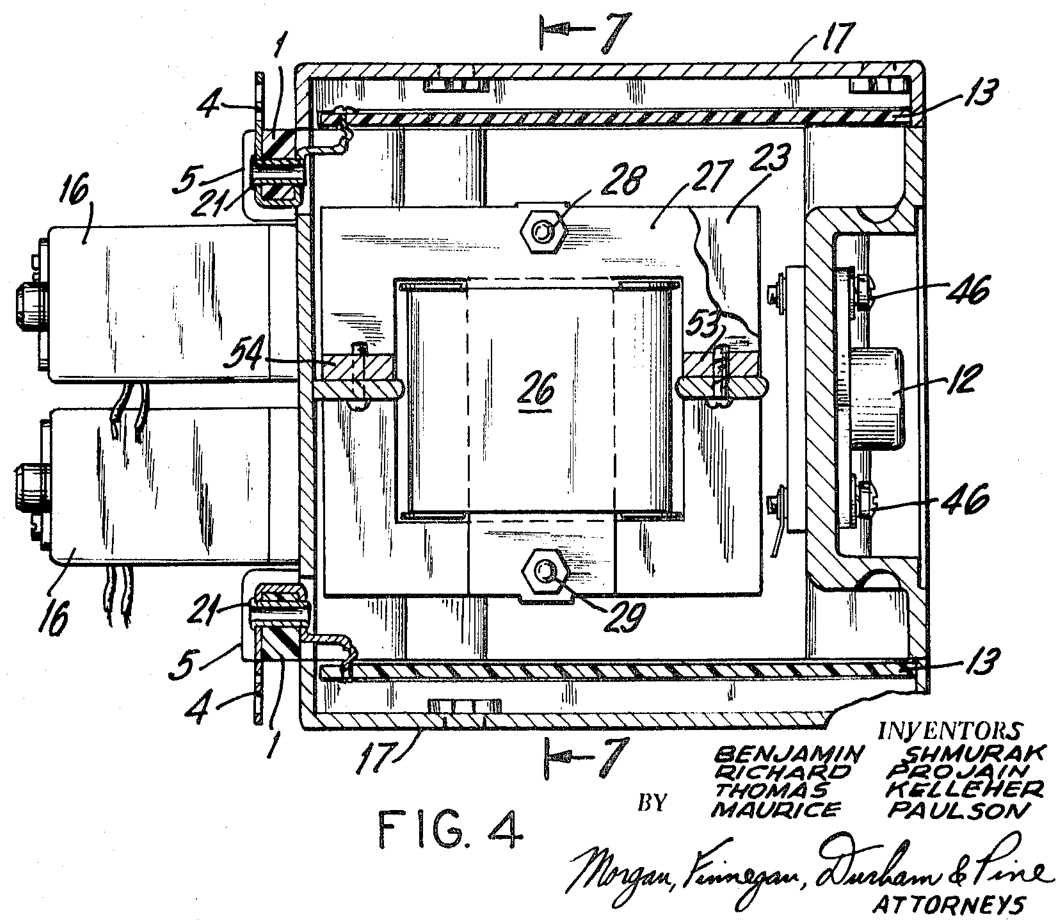
FIG. 4 is a vertical sectional view of the power supply taken along line 4–4 of FIG. 3.

In FIGS. 1 and 2, one embodiment of the invention is depicted; namely, a dual output power supply. The power supply 10 comprises a die-cast housing 11, a pair of circuit board covers 17 and a transistor recess cover 9. Barrier strips 15 and terminal marking strips 2 are affixed to the front of the housing as are over voltage boxes 16. Over voltage boxes 16 are designed to provide electrical protection of the power supply in the event of a malfunction within the supply. Transistors 12 are located within transistor sockets 19. Recesses 20 are provided to enable exterior mounting of the transistors without altering the multipositional mounting capability of the device.

Figure 9:
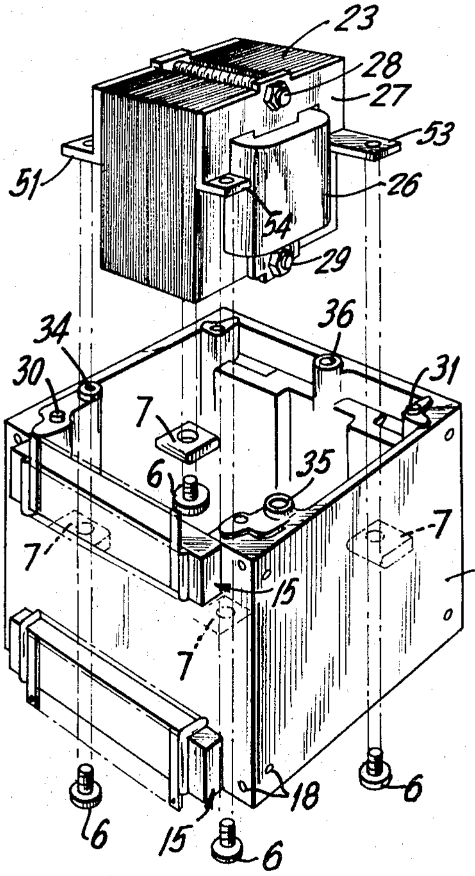
FIG. 9 is an exploded perspective view showing how the assembled transformer of FIG. 8 is to be mounted within the housing of the power supply of FIG. 1.
Figure 10:
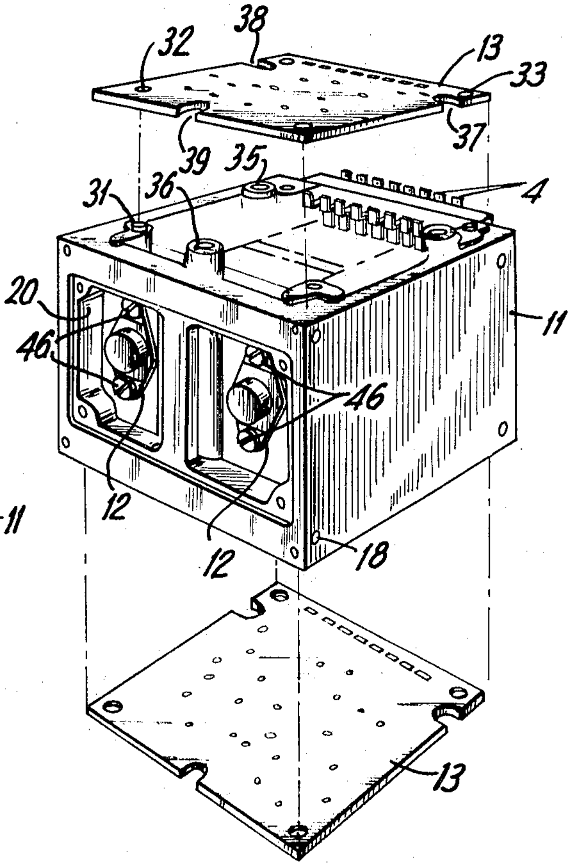
FIG. 10 is an exploded perspective view showing the manner by which the printed circuit boards are to be mounted within the housing of the power supply of FIG. 1.
Figure 8:
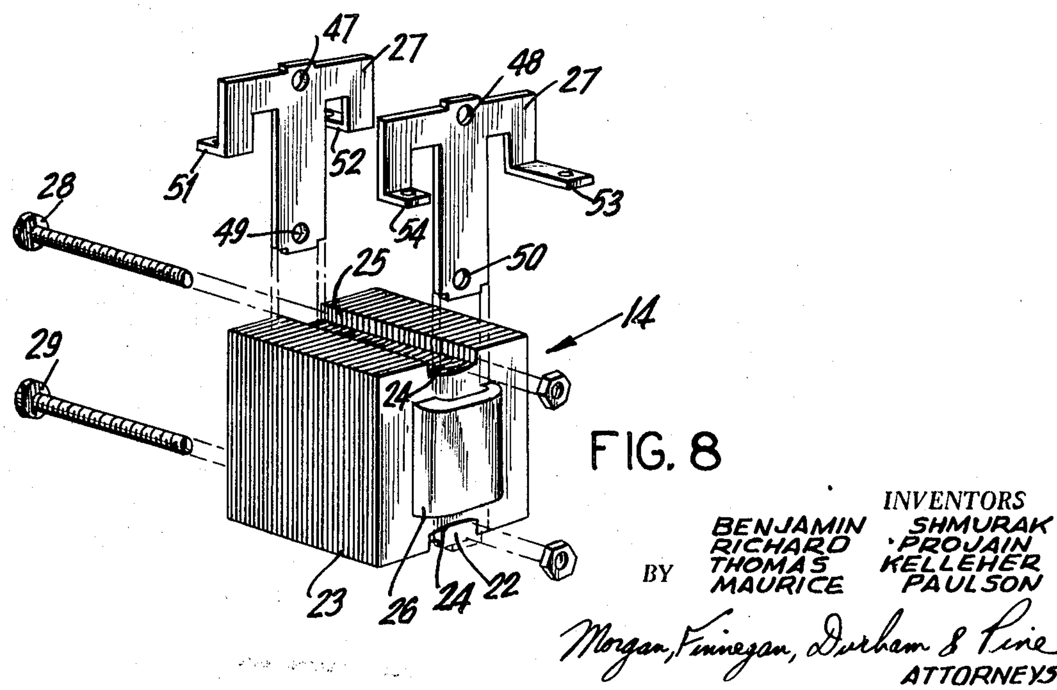
FIG. 8 is an exploded perspective view illustrating the assembly of the transformer employing the brackets of the instant invention.

In FIG. 8, transformer 14 is represented with its laminations 23, coil 26, fastening members 28 and 29 and brackets 27. FIG. 9 depicts the manner by which brackets 27 are utilized to mount transformer 14 within the limited dimensions of die-cast housing 11. FIG. 10 depicts the manner by which printed circuit boards 13 are assembled within the power supply.

In accordance with this invention a die-cast housing 11 is fabricated. Die-cast housing 11 can be made from any casting material; however, in one preferred embodiment, aluminum die-cast material A380 is utilized. Housing 11 is designed to provide the basic structural embodiment for the power supply. Housing 11 is basically square, open on two opposite surfaces and containing a pair of recesses 20 within one of its walls. The walls of housing 11 are flush and each contain threaded mounting recesses 18 (FIGS. 1 and 2) to enable multisurface mounting of the power supply.

The overall dimensions of the power supply are such so as to create a compact unit, the preferred embodiment being approximately 3½ inches in length per side. Recesses 20 contain transistor mounting sockets 19 thus providing for the recessed mounting of externally accessible transistors 12. A cover plate 9 is designed to be detachably mounted to housing 11 over recesses 20 via machine screws 8. Thus protection from external damage is provided for the transistors while still enabling their external replacement.

Die-cast housing 11 serves another important function. Housing 11 is designed to act as a heat sink for the device, thus making feasible this compact design. Transistors 12 are mounted in direct thermal conductive relationship with die-cast housing 11. Transformer 14, also a generating source of heat, is in proximity to the walls of die-cast housing 11 in addition to being in a thermal conductive relationship with die-cast housing 11 by way of mounting brackets 27. By such an arrangement, effective heat dissipation for the unit is achieved through the use of die-cast housing 11 as a heat exchanger thus eliminating the need to resort to a separate heat dissipating means within the power supply.

Die-cast housing 11 (FIGS. 8 and 9) is fashioned so that bracket support members 7 align with the mounting pedestals 51—54 of brackets 27 of transformer 14. Thus the mounting of transformer 14 within die-cast housing 11 is facilitated as one merely aligns the mounting pedestals 51—54 of brackets 27 with their corresponding bracket support members 7 of die-cast housing 11. Machine screws 6 are then threaded through the aligned threaded holds of bracket support members 7 and the corresponding mounting pedestals 51—54 of brackets 27.

Figures 5, 6, 7:
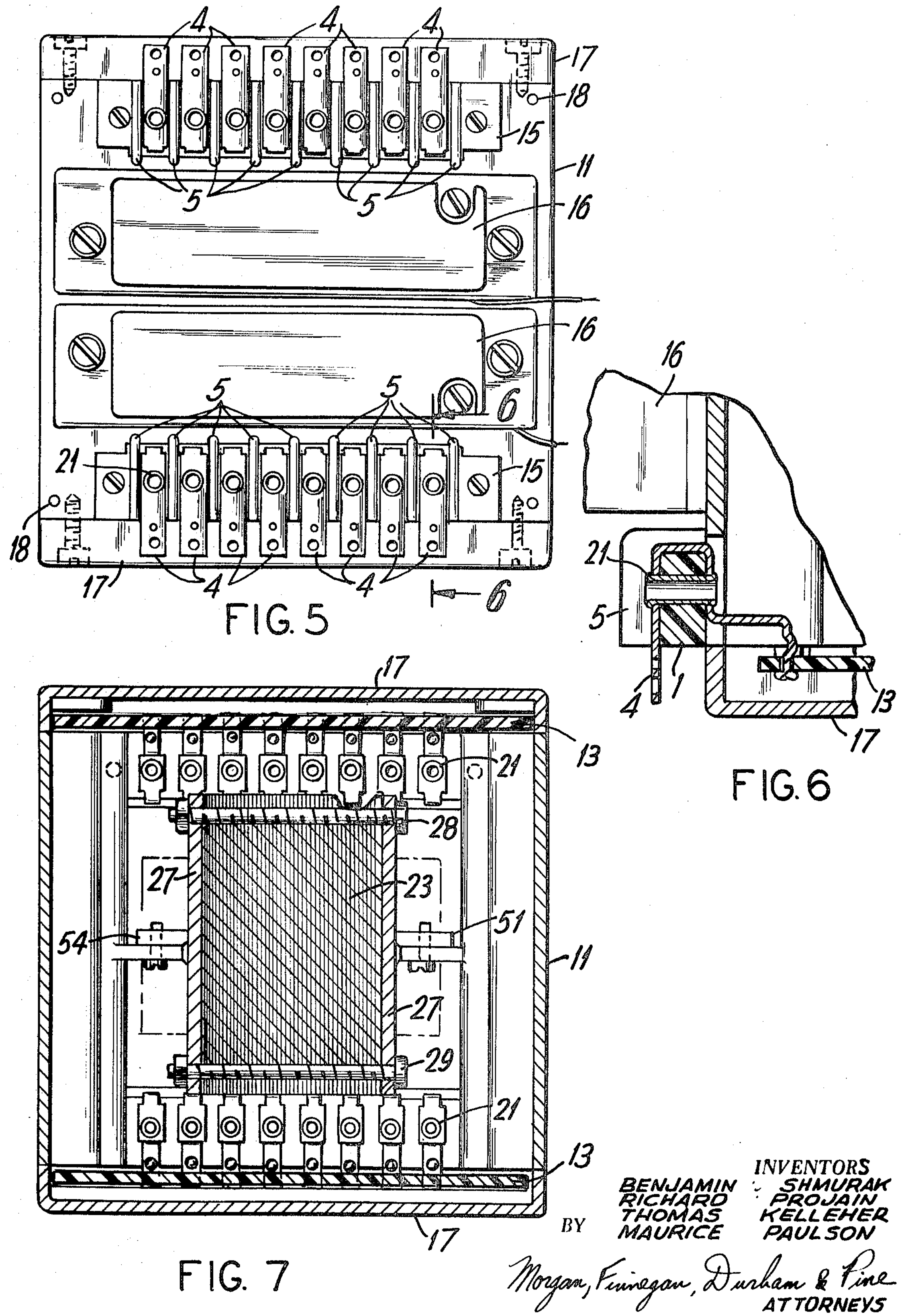
FIG. 5 is a front elevational view of the power supply of FIG. 1 absent the terminal marking strips so as to show the barrier strip construction of the instant invention.
FIG. 6 is an enlarged fragmentary sectional view taken along line 6–6 of FIG. 5 showing the manner in which the terminal connection of the barrier strip is conductively coupled to the printed circuit board.
FIG. 7 is a vertical sectional view taken along line 7–7 of FIG. 4.

Barrier strips 15 are affixed to the front of the power supply (FIG. 5). Barrier strips 15 are fashioned so as to provide a number of terminals, eight per barrier strip in the preferred embodiment, within the confines of the front face of the power supply. The particular design of the barrier strips provides an insulating barrier 5 mounted upon insulative block 1 (FIG. 6) and between each terminal connector 4 and at the ends of each barrier strip. The barriers 5 are designed to provide insulation not only between the terminal connectors 4 but also between terminal connectors 4 and over voltage box 16. By extending insulating barrier 5 past the end of the terminal connector 4 (FIG. 6), a portion of insulating barrier 5 is physically situated between the terminal connector 4 and over voltage box 16 thus preventing a possible short circuit from occurring by having contact occur between a terminal connector 4 and over voltage box 16. In addition, by employing the configuration of insulating barrier 5 depicted in FIG. 6, insulation is provided between terminal connectors 4 over the major portion of the terminal connector which appears outside of the die-cast housing 11.

Terminal connector 4 may be made out of any conductive material and takes on the configuration depicted in FIG. 6. Nonconductive fastener 21 affixes terminal connector 4 to insulative block 1. Due to the compact size of the present power supply, the length of the external portion of terminal connectors 4 has been shortened from that which is normally found in similar prior art devices. The dimensions of insulating barrier 5 have also been reduced over prior art designs. It has been found that an insulative barrier need not extend the entire length of the exposed terminal connector 4 to insulate against shorting across the terminals. By utilizing an insulative barrier 5 which is designed to extend only between a portion of the entire terminal connectors 4 as represented in FIGS. 5 and 6, effective insulation is achieved within the compact spacing. FIG. 6, in addition to depicting the manner by which insulating barrier 5 insulates the terminal connectors from each other and from over voltage boxes 16, depicts the manner by which terminal connector 4 is electrically integrally coupled to printed circuit board 13. By employing the configuration of terminal connector 4 depicted in FIG. 6 and by utilizing an insulating barrier 5 that insulates terminal connectors 4 from each other and from over voltage boxes 16, barrier strips of a miniaturized size are created which can be utilized within the small spacing provided. Terminal marking strips 2 are affixed as shown in FIG. 1 and provide a visual coding of the terminal connectors.

Die-cast housing 11 (FIG. 9) has, as part of its design, raised spacers 30 and 31 and raised threaded recesses 34, 35 and 36. The purpose of raised spacers 30 and 31 is to hold printed circuit boards 13 in a fixed relationship with respect to die-cast housing 11 and barrier strips 15. Printed circuit boards 13 have corresponding mating holes 32 and 33 for receiving raised spaces 30 and 31. In this manner, the coupling of terminal connector 4 to printed circuit board 13 (FIG. 6) is not subjected to stress resulting from the movement of printed circuit board 13 with respect to die-cast housing 11 and terminal connector 4. Raised threaded recesses 34, 35 and 36 also act as a restrictive means to any extensive movement between printed circuit board 13 and die-cast housing 11 as printed circuit board 13 also has cutout portions 37, 38 and 39 which are positioned so as to mate with raised threaded recesses 34, 35 and 36. In addition, raised threaded recesses 34, 35 and 36 have aligned with them fastening recesses 40, 41 and 42 which appear in circuit board cover 17. Fastening recesses 40, 41 and 42 are counterbored thus permitting flush mounting of circuit board cover 17 to die-cast housing 11 when machine screws 43, 44 and 45 are threaded through fastening recesses 40, 41 and 42 into raised threaded recesses 36, 35 and 34 respectively. The above means by which circuit board cover 17 is fastened to die-cast housing 11 is applicable to both of the circuit board covers.

Recesses 20 are designed to provide direct thermal conductivity between transistors 12 and die-cast housing 11, to provide for external access to mounted transistors 12 and to provide a design whereby the mounted transistors do not alter the profile of the power supply. Recess cover plate 9 is detachably mounted over recesses 20 by the utilization of machine screws 8 (FIG. 2), resulting in a protective flush surface which does not alter the dimensions of the power supply. A socket 19 is located within each recess 20. Socket 19 is located within each recess 20. Socket 19 houses transistor 12 and is designed such that by the removal of machine screws 46, access to transistor 12 is achieved. In this manner, transistors 12 become readily accessible for servicing.

Transformer 14 is designed to create a compact transformer which is centrally mounted within die-cast housing 11. The transformer is formed from a plurality of preformed laminations 23 (FIG. 8). Each lamination is provided with a pair of rounded recesses 24 appearing on opposite sides of the lamination. When the laminations are assembled, recesses 24 are aligned so that a pair of channels 25 and 22 are formed respectively. Each of the laminations is also perforated with a centrally located opening within which coil 26 of the transformer is mounted. A pair of brackets 27 are employed in association with machine screws and nuts 28 and 29 to hold laminations 23 in a compact fixed relationship with respect to each other and centrally positioned coil 26 thus forming transformer 14.

The overall design criterion for transformer 14, including its mounting brackets 27, is compactness. By utilizing channels 25 and 22 in conjunction with the specific design of brackets 27, a compact transformer whose width is equal to the width of its individual laminations, whose height is only slightly greater than the height of its individual laminations and whose length is only slightly greater than the length of the incorporated coil is created. Brackets 27 are basically in a "T" design and made of a nonferrous material. The height of the bracket basically corresponds to the height of laminations 23 but for a slight extension of the bracket at its fastening holes. The width of the bracket corresponds to the width of lamination 23. In assembling transformer 14, laminations 23 are aligned, coil 26 is securely fitted within the spacing created within the center of the laminations and the leg of each bracket 27 is passed through the end of each loop in coil 26 and between each end lamination and coil 26 as depicted in FIG. 8. Fastening holes 47, 48, 49 and 50 are aligned with channels 25 and 22 such that machine screw 28 passes through fastening hole 47, along channel 25 and through fastening hole 48 at which point the nut to machine screw 28 is fastened. Machine screw 29 similarly passes through fastening hole 49, along channel 22 and through fastening hole 50 at which point the nut to machine screw 29 is fastened. In this manner a compact mountable transformer is achieved whose overall dimensions are basically defined by the coil's length and the laminations height and width.

Brackets 27 have mounting pedestals 51, 52, 53 and 54. These mounting pedestals contain a threaded hole which aligns with corresponding bracket members 7 (FIG. 9). Machine screws 6 fasten mounting pedestals 51, 52, 53 and 54 to their corresponding bracket member 7 thus mounting transformer 14 within die-cast housing 11. In this preferred embodiment, mounting pedestals 52 and 53 extend slightly past the ends of coil 26 so as to align their threaded holes with their corresponding bracket members 7. Mounting pedestals 51 and 54, however, are within the dimensional limits of coil 26.

Figure 11:
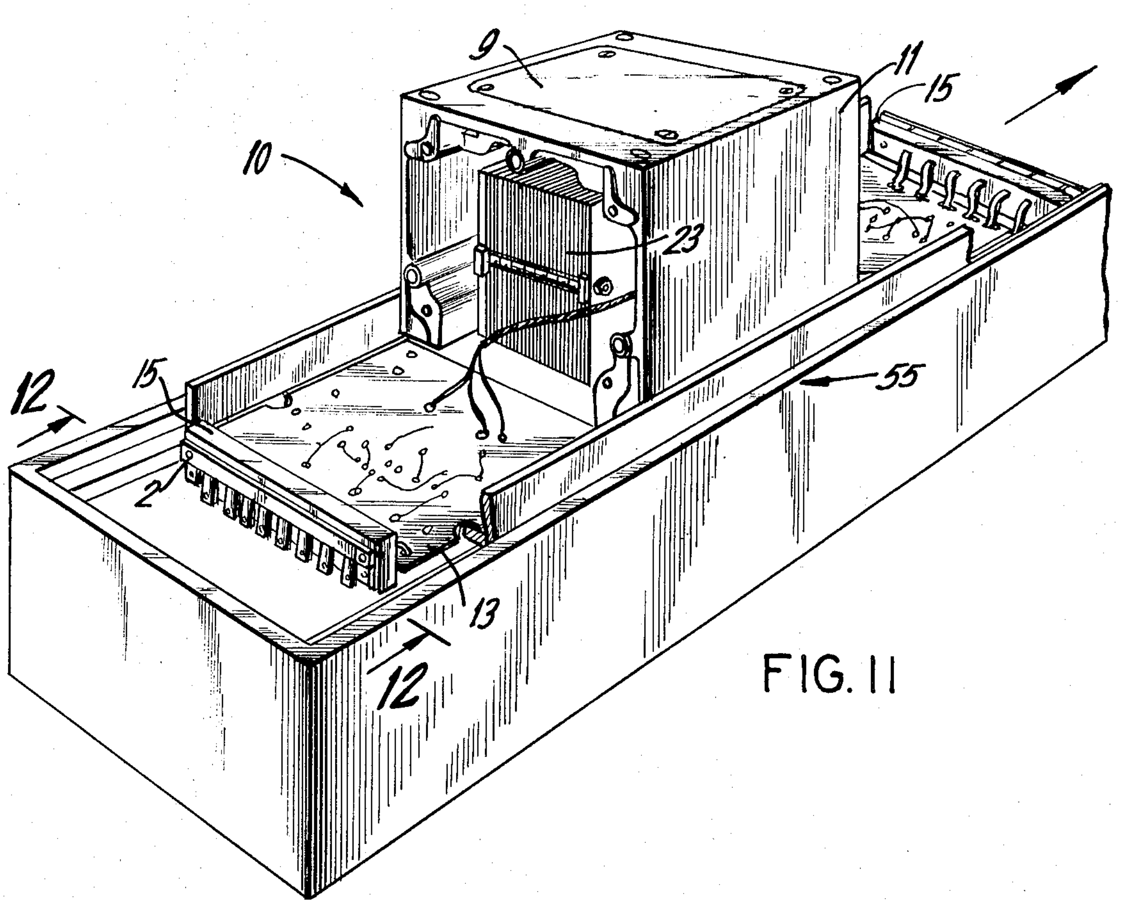
FIG. 11 is a perspective view showing the wave soldering of the printed circuit boards wherein the printed circuit boards are subjected to wave soldering during one continuous soldering process.
Figure 12:
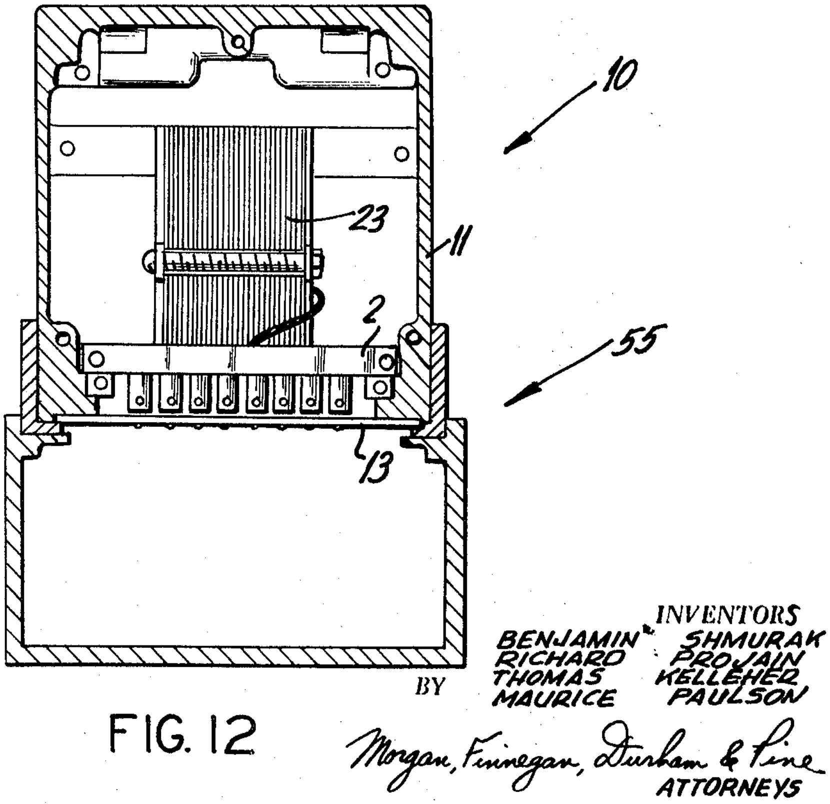
FIG. 12 is a vertical sectional view taken along line 12–12 of FIG. 11.

FIGS. 11 and 12 represent the manner in which the circuitry is placed upon printed circuit boards 13. A conventional wave soldering machine 55 is utilized. However, to facilitate manufacture, die-cast housing 11 with a pair of printed circuit boards 13 already wired to their respective terminal connectors 4 is placed upon the carrier palet of the wave soldering machine (FIG. 11). The printed circuit boards are in a position 90° from their normal positions within the die-cast housing. Housing and printed circuit boards all move together upon the carrier palet during the wave soldering process. Upon completion of the soldering process, the housing and circuit boards are removed and the circuit boards are rotated into place. In this manner, an efficient means of accomplishing the wave soldering of the circuit boards within the fabricating process is achieved.

We claim:

1. A power supply comprising:

a. a die-cast housing of unitary construction formed of thermal conductive material having a rectangular cross-sectional configuration and defining a through opening;

b. two electrically independent printed circuit boards removably externally mounted on said housing on opposite sides thereof closing off said through opening;

c. a pair of circuit board covers removably externally affixed to said housing enclosing said printed circuit boards and together with said housing forming a substantially cube-shaped enclosure for said supply;

d. a transformer removably internally mounted directly onto said housing in direct thermal conductive relation therewith, said transformer being operatively connected to both of said printed circuit boards;

e. a power transistor for each of said printed circuits operatively connected to its associated printed circuit and mounted on said housing in direct thermal conductive relation therewith; and f. an insulative terminal block for each of said printed circuits externally mounted on said housing, said terminal blocks each having a plurality of electrically conductive terminal connectors extending through the walls of said housing to operatively connect directly with their associated printed circuit.

2. A power supply as defined in claim 1 further comprising a. socket means for each of said transistors internally mounted on said housing, said housing defining external transistor recesses and through openings within said recesses operatively aligned with said socket means, said transistors being disposed within said recesses in removable operative engagement with said socket means via said through openings, and b. a transistor cover removably externally affixed to said housing fully closing off said transistors and recesses.

3. A power supply as defined in claim 1 wherein said terminal blocks each comprise an elongated insulative block arranged in parallel spaced apart relation to each other on one side of said housing, said elongated insulative blocks having a plurality of spaced apart upstanding insulative barrier walls arranged in alternating relation with said terminal connectors, said barrier walls extending transversely around said blocks along the exposed face of said blocks adjacent to each other, and said terminal connectors extending transversely of said block around one edge thereof between said barriers and through suitable openings formed in said housing.

4. A power supply as defined in claim 1 said transformer comprising a plurality of rectangular laminations pressing together via bracket means conjointly defining a pair of grooves extending across opposite sides thereof in parallel relation and a central through opening, and a coil disposed within said opening and extending outwardly therefrom at opposite sides of said core to define two loops, said brackets each having a general "T" configuration including a central leg substantially coextensive with said core and passing through a loop of said coil, said central leg being formed from a nonferrous material.

5. A power supply comprising:

a. a die-cast housing of unitary construction formed of thermal conductive material having a rectangular cross-sectional configuration that defines a through opening and that additionally defines external transistor recesses having through openings formed therein to communicate with the interior of said housing;

b. two electrically independent printed circuit boards removably externally mounted on said housing on opposite sides thereof closing off said through opening;

c. a pair of circuit board covers removably externally affixed to said housing enclosing said printed circuit boards and together with said housing forming a substantially cube-shaped enclosure for said supply;

d. a transformer removably internally mounted on said housing in thermal conductive relation therewith, said transformer being operatively connected to both of said printed circuit boards;

e. a power transistor for each of said printed circuits operatively connected to its associated printed circuit and mounted by way of socket means on said housing in thermal conductive relation therewith, said socket means being operatively aligned with the through openings of said external transistor recesses in removably operative engagement with said socket means via said through openings;

f. a transistor cover removably externally affixed to said housing fully closing off said transistors and said recesses; and g. an insulative terminal block for each of said printed circuits externally mounted on said housing, said terminal blocks each having a plurality of electrically conductive terminal connectors extending through the walls of said housing to operatively connect with their associated printed circuit.

6. A power supply comprising:

a. a die-cast housing of unitary construction formed of thermal conductive material having a rectangular cross-sectional configuration that defines a through opening and that additionally defines an external transistor recess having a through opening formed therein to communicate with the interior of said housing;

b. an electrically independent printed circuit removably externally mounted on said housing to close off one face of said through opening;

c. a pair of covers removably externally affixed to said housing enclosing said printed circuit and the remaining open face of said through opening to form a substantially cube-shaped enclosure for said supply;

d. a transformer removably internally mounted on said housing in thermal conductive relation therewith, said transformer being operatively connected to said printed circuit;

e. a power transistor operatively connected to said printed circuit and mounted by way of socket means on said housing in thermal conductive relation therewith, said socket means being operatively aligned with the through opening of said external transistor recess such that said transistor is disposed within said recess in removable operative engagement with said socket means via said through opening; and f. an insulative terminal block externally mounted on said housing, said terminal block having a plurality of electrically conductive terminal connectors extending through the walls of said housing to operatively connect with said printed circuit.